(12) United States Patent
Kenkare et al.

(10) Patent No.: US 9,969,854 B2
(45) Date of Patent: May 15, 2018

(54) FOAM MATERIALS

(71) Applicant: SOLVAY SPECIALTY POLYMERS USA, LLC., Alpharetta, GA (US)

(72) Inventors: Nirupama Kenkare, Alpharetta, GA (US); Kermit S. Kwan, Cumming, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days. days.

(21) Appl. No.: 15/107,351

(22) PCT Filed: Dec. 18, 2014

(86) PCT No.: PCT/EP2014/078461
§ 371 (c)(1),
(2) Date: Jun. 22, 2016

(87) PCT Pub. No.: WO2015/097058
PCT Pub. Date: Jul. 2, 2015

(65) Prior Publication Data
US 2017/0022344 A1    Jan. 26, 2017

Related U.S. Application Data

(60) Provisional application No. 61/919,969, filed on Dec. 23, 2013.

(30) Foreign Application Priority Data

Mar. 5, 2014 (EP) .................................. 14157790

(51) Int. Cl.
| | |
|---|---|
| *C08J 9/00* | (2006.01) |
| *C08G 75/23* | (2006.01) |
| *C08L 81/06* | (2006.01) |
| *C08J 9/10* | (2006.01) |
| *C08J 9/12* | (2006.01) |
| C08G 75/00 | (2006.01) |

(52) U.S. Cl.
CPC ............ *C08J 9/0061* (2013.01); *C08G 75/23* (2013.01); *C08J 9/00* (2013.01); *C08J 9/0066* (2013.01); *C08J 9/10* (2013.01); *C08J 9/108* (2013.01); *C08J 9/12* (2013.01); *C08L 81/06* (2013.01); *C08J 2201/03* (2013.01); *C08J 2203/04* (2013.01); *C08J 2205/052* (2013.01); *C08J 2205/10* (2013.01); *C08J 2207/06* (2013.01); *C08J 2381/06* (2013.01); *C08J 2423/04* (2013.01); *C08J 2423/10* (2013.01); *C08J 2423/12* (2013.01)

(58) Field of Classification Search
CPC ........................................................ C08J 9/00
USPC ........................................................ 521/90
See application file for complete search history.

(56) References Cited

U.S. PATENT DOCUMENTS

| | | | |
|---|---|---|---|
| 3,442,829 A | 5/1969 | Moore | |
| 3,873,477 A | 3/1975 | Beck et al. | |
| 4,142,029 A | 2/1979 | Illy | |
| 4,774,266 A * | 9/1988 | Boudakian | ............... C08J 9/108 521/90 |
| 4,940,733 A | 7/1990 | Kuphal et al. | |
| 5,091,126 A | 2/1992 | Weber et al. | |

FOREIGN PATENT DOCUMENTS

| | | |
|---|---|---|
| EP | 0411437 A2 | 2/1991 |
| WO | 2013053851 A1 | 4/2013 |
| WO | WO 2013/053851 * | 4/2013 |
| WO | 2013092689 A1 | 6/2013 |
| WO | WO 2013/092689 * | 6/2013 |

* cited by examiner

*Primary Examiner* — Duc Truong
(74) *Attorney, Agent, or Firm* — Jarrod N. Raphael; Helene Laville

(57) ABSTRACT

A foamable composition comprising from 60 to 99.88% by weight (% wt.) of at least one poly(aryl ether sulfone), from 0.10 to 10.00% by weight (% wt.) of at least one olefinic polymer, from 0.01 to 5.00% by weight (% wt.) of at least one tetrazole compound and from 0.01 to 2.50% by weight (% wt.) of at least one additive selected from the group of titanium dioxide (TiO2), clays, talc, silicates, silica, aluminates, barites, titanates, borates, nitrides, carbon-based materials or combinations thereof, all % wt. are relative to the total weight of the composition (C). Foam materials made from said foamable compositions and articles made from said foam materials.

15 Claims, No Drawings

FOAM MATERIALS

CROSS-REFERENCE TO RELATED APPLICATION

This application claims priority to U.S. provisional application No. 61/919,969 filed Dec. 23, 2013 and to European application No. 14157790.8 filed Mar. 5, 2014, the whole content of each of these applications being incorporated herein by reference for all purposes.

FIELD OF INVENTION

The present invention relates to foamable compositions, in particular to aromatic poly(aryl ether sulfone) foamable compositions. The invention further relates to foam materials made from foamable compositions, the methods of manufacturing said foamable compositions and foam materials. The invention further relates to articles made therefrom.

BACKGROUND OF THE INVENTION

Foams of high temperature processing thermoplastic resins such as, for example, polystyrene, polyethylene, polycarbonate are useful industrial products because of their excellent heat-insulating, cushioning, and other properties. Accordingly, such foams are widely used for various purposes in various market fields associated with soundproof, insulating materials, in particular thermal insulation, cushioning and vibration-isolating materials, light reflection plates, light diffusion plates etc. and as raw materials for the fabrication of various shaped articles.

The foaming of high temperature processing thermoplastic resins by using chemical foaming agents is well known in the art.

A chemical foaming agent decomposes on heating to a specific temperature to yield a vapor or gas or mixture of vapors and gases. The chemical foaming agent is typically incorporated in the thermoplastic resin at a temperature below the decomposition temperature of said foaming agent. The mixture so obtained is then subsequently heated to a temperature above the foaming agent's decomposition temperature whereupon the chemical foaming agent decomposes to liberate a gas or vapor which forms small voids within the thermoplastic resin.

Tetrazole compounds have been widely used as chemical foaming agent for foaming high temperature processing thermoplastic polymers.

The use of the commercially available 5-phenyltetrazole in the foaming of thermoplastic materials is notably described in U.S. Pat. No. 3,442,829.

While 5-phenyltetrazole is an effective high temperature foaming agent having a decomposition temperature in the range of about 230° C. to 250° C., it has been found to have deficiencies in certain applications. For example, it tends to cause discoloration when it is not completely decomposed. When 5-phenyltetrazole is used with polycarbonate resins, some polymer degradation takes place during the foaming process as evidenced, for example, by a reduction in foam impact strength.

U.S. Pat. No. 4,774,266 discloses the use of N-substituted 5-phenyltetrazole compounds as chemical foaming agents for the foaming polymers and copolymers having high processing temperatures. It was especially noted that these type of chemical foaming agent minimize polymer degradation and provide products with increased impact strengths.

U.S. Pat. No. 3,873,477 describes tetrazole metal salts of zinc, barium, calcium, lead and aluminum and their use a chemical foaming agent in high temperature processing, in particular polycarbonate.

Bis-tetrazoles wherein the two tetrazole rings are bridged by a direct bond or a divalent organic residue, in particular aliphatic or araliphatic residues, in 5,5'-position or in 1,1'-position have been described in U.S. Pat. No. 4,142,029 as useful chemical foaming agents for thermoplastic resins. They decompose at temperatures of about 230° to 300° C.

Aromatic poly(aryl ether sulfone) polymers, such as notably polyphenylsulfone (PPSU) polymers, polyethersulfone (PESU) polymers, polysulfone (PSU) polymers are also known high temperature processing thermoplastic and possess a number of attractive features such as excellent high temperature resistance, good electrical properties, toughness and tolerance to a host of chemical environments.

Polysulfone (PSU) polymers are commercially available from Solvay Specialty Polymers USA, L.L.C. (i.e., under the trademark UDEC). PSU has a high glass transition temperature (e.g., about 185° C.) and exhibits high strength (>70 MPa) and toughness (>65 J/m notched impact, 50-100% elongation at break).

Polyphenylsulfone (PPSU) polymers are recognized for instance, for their high temperature capabilities (with a glass transition temperature (Tg) of 220° C.), for its outstanding chemical resistance and for its inherent flame retardant properties.

RADEL® R is for example a polyphenylsulfone (PPSU) polymer commercially available from SOLVAY SPECIALTY POLYMERS USA, LLC.

Polyethersulfone (PESU) polymers are also known for their high temperature capabilities, also having a glass transition temperature (Tg) of about 220° C. These polyethersulfone (PESU) polymers have a high heat resistance, hydrolysis resistance in steam and hot water environments, good overall chemical resistance and excellent electrical properties.

Commercially available (PESU) include notably VERADEL® PESU available from Solvay Specialty Polymers USA, L.L.C.

It is generally known that the decomposition temperature of the chemical foaming agent should ideally be about 20° C. below the maximum foaming temperature in order to obtain a homogeneous cellular structure and maximum utilisation of the chemical foaming agent.

It is, of course, of great importance that the chemical foaming agent be homogeneously dispersed within the thermoplastic material to obtain a product having a uniform cellular structure. It is generally known that chemical foaming agents may be present in powder form, concentrates or masterbatches in the form of pellets. Powder foaming agents, such as notably 5-phenyltetrazole, can lead to feeding problems in the foam extruder as powders are more difficult to meter. In general, it is easier to feed a foaming agent in the form of a pelletized foaming agent masterbatch that is made with a carrier material. However, these carrier polymers can influence the foaming process and need to be compatible with the polymer to be foamed.

In view of the above, the choice of the chemical foaming agent and any other additive will be of ultimate importance in the development of foam materials including the aromatic poly(aryl ether sulfone) polymers, such as notably polyphenylsulfone (PPSU) polymers, polyethersulfone (PESU) polymers, polysulfone (PSU) polymers having high Tg values, as detailed above.

There is thus still a need for foamable compositions comprising aromatic poly(aryl ether sulfone) polymers which can provide foam materials having superior mechanical properties such as high stiffness and strength properties, good electrical, and fire performance characteristics, improved thermal performance capabilities, in particular more robust resistance to very high temperatures used in the manufacturing of structural foamed articles and having improved chemical resistance, improved structural integrity, high void content and closed cell structures.

SUMMARY OF INVENTION

The present invention addresses the above detailed needs and relates to a foamable composition [composition (C), herein after] comprising:

(i) from 60 to 99.88% by weight (% wt.) of at least one poly(aryl ether sulfone) [(PAES) polymer herein after], wherein more than 50% by moles of the recurring units of said (PAES) polymer are recurring units ($R_{PAES}$) selected from the group consisting of those of formulae (S-A) to (S-C), herein below:

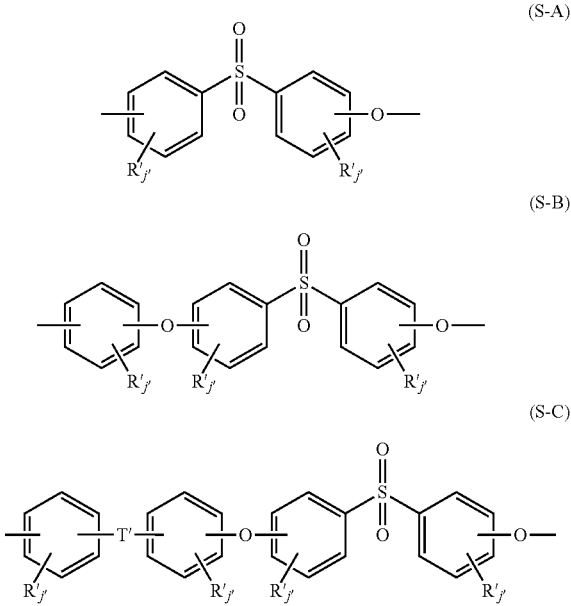

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T is a bond or a divalent group optionally comprising one or more than one heteroatom; preferably T is selected from the group consisting of a bond, —$CH_2$—, —C(O)—, —C($CH_3$)$_2$—, —C($CF_3$)$_2$—, —C(=$CCl_2$)—, —C($CH_3$)($CH_2CH_2COOH$)—, —$SO_2$—, and a group of formula:

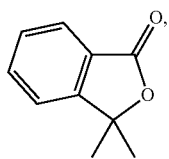

and (ii) from 0.10 to 10.00% by weight (% wt.) of at least one olefinic polymer selected from the group consisting of a very low density polyethylene, a linear low density polyethylene, a low density polyethylene, a high density polyethylene, a propylene homopolymer, a propylene copolymer, a linear homogeneous ethylene/alpha-olefin copolymer, a homogeneous ethylene/alpha-olefin copolymer having long chain branching, (iii) from 0.01 to 5.00% by weight (% wt.) of at least one tetrazole compound selected from the group consisting of those of formulae T-1, T-2, T-3 and T-4, herein below:

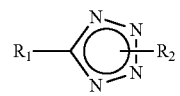

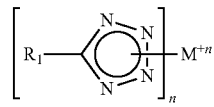

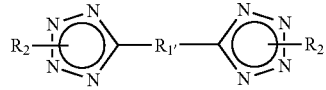

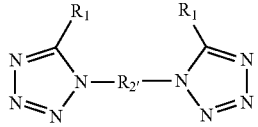

Wherein:
$R_1$ is selected from a group consisting of alkyl, cycloalkyl, arylalkyl and aryl group, $R_2$ is selected from a group consisting of hydrogen, alkyl, cycloalkyl, aryl, aralkylene, alkenyl, alkenylaryl and alkenylaralkylene group, optionally substituted $R_{1'}$ and $R_{2'}$, equal to or different from each other and at each occurrence, is independently selected from a group consisting of a bond or a divalent group optionally comprising one or more than one heteroatom, n is a number 2 or 3, M is a metal cation selected from the group consisting of barium, calcium, zinc lead or aluminium.

(iv) from 0.01 to 2.50% by weight (% wt.) of at least one additive selected from the group of titanium dioxide ($TiO_2$), clays, talc, silicates, silica, aluminates, barites, titanates, borates, nitrides, carbon-based materials or combinations thereof, all % wt. are relative to the total weight of the composition (C).

Another aspect of the present invention is directed to a process for the manufacturing of the composition (C).

Another aspect of the present invention is directed to a foam material made from the foamable composition (C).

Another aspect of the present invention is directed to a process for the manufacturing of the foam material.

Yet another aspect of the present invention is directed to an article that includes said foam material.

DETAILED DESCRIPTION OF EMBODIMENTS

Within the context of the present invention the mention "at least one poly(aryl ether sulfone) [(PAES) polymer]" is intended to denote one or more than one (PAES) polymer. Mixtures of (PAES) polymers can be advantageously used for the purposes of the invention.

In the rest of the text, the expressions "(PAES) polymer" are understood, for the purposes of the present invention, both in the plural and the singular, that is to say that the inventive composition may comprise one or more than one (PAES) polymer.

Similarly, within the context of the present invention the mention "at least one olefinic polymer", "at least one tetrazole compound" and "at least one additive", respectively is intended to denote one or more than one olefinic polymer, one or more than one tetrazole compound and one or more than one additive, respectively.

In the rest of the text, the expressions "olefinic polymer", "tetrazole compound" and "additive", respectively are understood, for the purposes of the present invention, both in the plural and the singular, that is to say that the inventive composition may comprise one or more than one olefinic polymer, one or more than one tetrazole compound and one or more than one additive, respectively.

(PAES) Polymer

In the (PAES) polymer, as detailed above, preferably more than 75%, more preferably more than 85%, still more preferably more than 95% moles and particularly more preferably more than 99% moles of the recurring units are recurring units ($R_{PAES}$), as detailed above.

Still, it is generally preferred that substantially all recurring units of the (PAES) polymer are recurring units ($R_{PAES}$), as detailed above; chain defects, or very minor amounts of other units might be present, being understood that these latter do not substantially modify the properties of (PAES) polymer.

As will be detailed later on, the (PAES) polymer may be a bisphenol A polysulfone. Alternatively, the (PAES) polymer may be a polyethersulfone, a polyetherethersulfone or a polyphenylsulfone.

The (PAES) polymer may also be a blend composed of at least two poly(aryl ether sulfone)s chosen from a group consisting of a polyphenylsulfone, a polyethersulfone, a polyetherethersulfone or a bisphenol A polysulfone.

For the purpose of the present invention, a bisphenol A polysulfone is intended to denote any polymer of which more than 50% moles of the recurring units are recurring units ($R_a$) of formula (A):

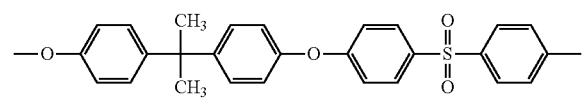

(A)

Preferably more than 75% moles, preferably more than 85% moles, preferably more than 95% moles, preferably more than 99% moles of the recurring units of the bisphenol A polysulfone are recurring units of formula (A). Most preferably substantially all the recurring units of the bisphenol A polysulfone are recurring units of formula (A), chain defects, or very minor amounts of other units might be present, being understood that these latter do not substantially modify the properties of the bisphenol A polysulfone.

The bisphenol A polysulfone may be a homopolymer, or it may be a copolymer such as a random or a block copolymer. When the bisphenol A polysulfone is a copolymer, its recurring units are advantageously a mix of recurring units (Ra) and of recurring units (Ra*), different from recurring units (Ra), such as:

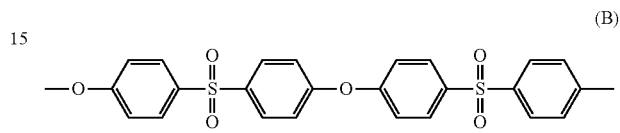

(B)

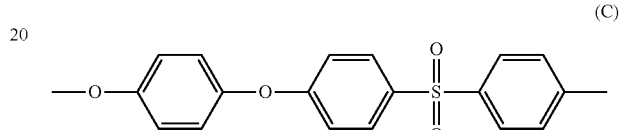

(C)

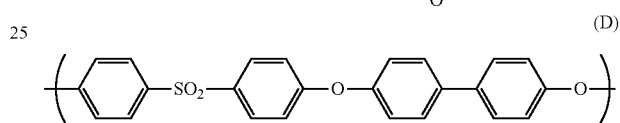

(D)

and mixtures thereof.

The Bisphenol A polysulfones can also be a blend of the previously cited homopolymer and copolymer.

The Bisphenol A polysulfones are notably available as UDEL® PSF from Solvay Specialty Polymers USA, L.L.C.

Bisphenol A polysulfones can be prepared by known methods.

For the purpose of the present invention, a polyethersulfone is intended to denote any polymer of which more than 50% moles of the recurring units are recurring units (Rb) of formula B

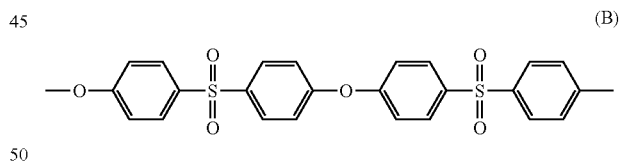

(B)

Preferably more than 75% moles, preferably more than 85% moles, preferably more than 95% moles, preferably more than 99% moles of the recurring units of the polyethersulfone are recurring units of formula (B). Most preferably substantially all the recurring units of the polyethersulfone are recurring units of formula (B), chain defects, or very minor amounts of other units might be present, being understood that these latter do not substantially modify the properties of the polyethersulfone.

The polyethersulfone may be notably a homopolymer, or a copolymer such as a random or a block copolymer. When the polyethersulfone is a copolymer, its recurring units are advantageously a mix of recurring units (Rb) of formula (B) and of recurring units (Rb*), different from recurring units (Rb), such as recurrings units of formula (A), (C) or (D) represented hereafter:

(A)

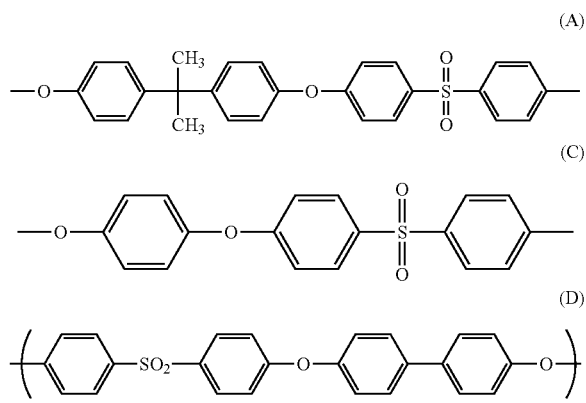

(C)

(D)

and mixtures thereof.

The polyethersulfone can also be a blend of the previously cited homopolymer and copolymer.

Polyethersulfone is notably available as VERADEL® PES from Solvay Specialty Polymers USA, L.L.C.

Polyethersulfones can be prepared by known methods.

For the purpose of the present invention, a polyetherethersulfone is intended to denote any polymer of which more than 50% moles of the recurring units are recurring units (Rc) of formula (C), as shown below (C)

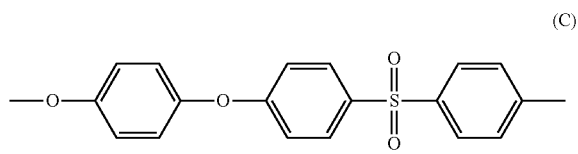

Preferably more than 75% moles, preferably more than 85% moles, preferably more than 95% moles, preferably more than 99% moles of the recurring units of the polyetherethersulfone are recurring units of formula (C). Most preferably substantially all the recurring units of the polyetherethersulfone are recurring units of formula (C), chain defects, or very minor amounts of other units might be present, being understood that these latter do not substantially modify the properties of the polyetherethersulfone.

The polyetherethersulfone may be notably a homopolymer, or a copolymer such as a random or a block copolymer. When the polyetherethersulfone is a copolymer, its recurring units are advantageously a mix of recurring units (Rc) of formula (C) and of recurring units (Rc*), different from recurring units (Rc), such as recurrings units of formula (A), (B) or (D) represented hereafter:

(A)

(B)

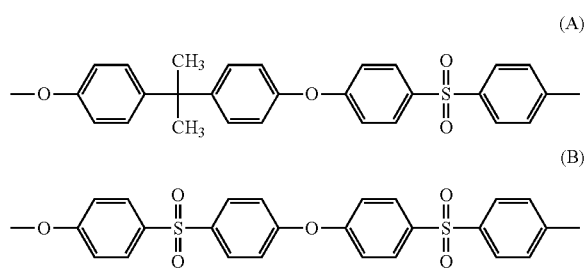

(D)

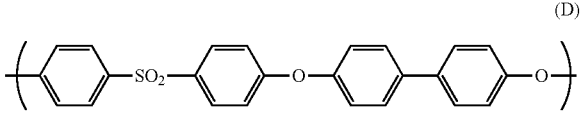

and mixtures thereof.

The polyetherethersulfone can also be a blend of the previously cited homopolymer and copolymer.

Polyetherethersulfones can be prepared by known methods.

For the purpose of the present invention, a polyphenylsulfone (PPSU) is intended to denote any polymer of which more than 50% moles of the recurring units are recurring units (Rd) of formula (D), as shown below:

(D)

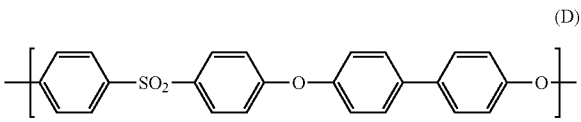

Preferably more than 75% moles, preferably more than 85% moles, preferably more than 95% moles, preferably more than 99% moles of the recurring units of the polyphenylsulfone (PPSU) are recurring units (Rd) of formula (D). Still more preferably, substantially all the recurring units of the polyphenylsulfone (PPSU) are recurring units (Rd) of formula (D), chain defects, or very minor amounts of other units might be present, being understood that these latter do not substantially modify the properties of the polyphenylsulfone (PPSU).

The polyphenylsulfone may be notably a homopolymer, or a copolymer such as a random or a block copolymer. When the polyphenylsulfone is a copolymer, its recurring units are advantageously a mix of recurring units (Rd) of formula (D) and of recurring units (Rd*), different from recurring units (Rd), such as recurrings units of formula (A), (B) or (C) represented hereafter:

(A)

(B)

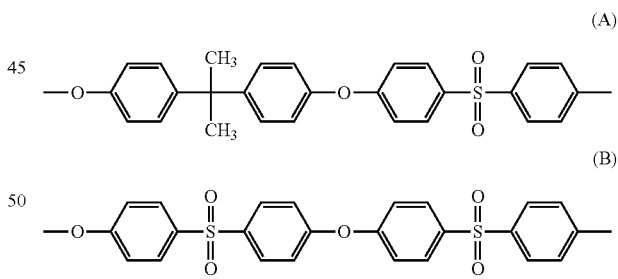

and mixtures thereof.

The polyphenylsulfone can also be a blend of the previously cited homopolymer and copolymer.

RADEL® R PPSU from Solvay Specialty Polymers USA, L.L.C. is an example of a polyphenylsulfone polymer.

Polyphenylsulfones can be prepared by known methods.

The weight average molecular weight ($M_w$) in the polymer (PAES) can be from 2,000 to 60,000 grams per mole (g/mol) as determined by gel permeation chromatography using ASTM D5296 with polystyrene standards.

The glass transition temperature (Tg) of the polymer (PAES) can be from 150° C. to 300° C. as determined by DSC according to the ASTM 3418 method.

According to a preferred embodiment of the invention, the PAES polymer is bisphenol A polysulfones comprising recurring units (Ra), as detailed above.

According to certain preferred embodiments, more than 70% by weight, and more preferably more than 85% by weight of the recurring units of the (PAES) polymer are recurring units (Ra), as detailed above, the complement to 100% by weight being generally recurring units (Ra*) selected from a group consisting of formula B, formula C and formula D, as detailed above.

Still, it is generally preferred that substantially all recurring units of (PAES) polymer are recurring units (Ra) of formula (A), as detailed above; chain defects, or very minor amounts of other units might be present, being understood that these latter do not substantially modify the properties of (PAES) polymer.

The (PAES) polymers have been found particularly suitable for the compositions (C) comprised in the foam material of the present invention in view of their advantageous properties as high mechanical strength, thermal and oxidative resistance, resistance to hydrolysis and to many acids, bases and solvents which is in turn imparted into the foam material.

Olefinic Polymer

The olefinic polymer of the composition (C) is preferably chosen among a very low density polyethylene, a linear low density polyethylene, a low density polyethylene, a propylene homopolymer or a propylene copolymer, more preferably chosen among a linear low density polyethylene or a propylene homopolymer. The propylene homopolymer is most preferred.

The typical practical use of a polymer such as olefin in chemical foaming is as a carrier polymer to facilitate feeding and dispersion of the foaming agent (typically a powder). In our situation, while the combining of the 5-phenyl tetrazol with polyolefin certainly enhances the ease of the feeding of the foaming agent, the unusually high foaming temperatures of sulfone polymers and the immiscibility of polysulfones and polyolefins make the use of polyolefins in this application unusual. From our observations, due to the high foaming temperatures, the immiscible polyolefin phase is present in an unfoamed state (or in a collapsed state due to the poor melt strength of the olefin at these high temperatures). Despite the immiscibility of the sulfone/olefin blend and poor mechanical mixing in the single screw extruder, very fine (~5 μm) polyolefin domains are found to be distributed fairly uniformly throughout the foam and are found embedded in the cells.

The Applicant has found that the olefinic polymer is especially well suited for providing compositions (C) comprised in the foam material of the present invention which achieve the desired density, cell size, and cell size distribution targets, and which are easy to fabricate into film-like or sheet-like foams. The presence of the olefinic polymer provides an additional parameter that allows for fine control over foam attributes such as density and cell sizes (in contrast to the relatively coarse control provided by traditional nucleating agents such as talc).

Tetrazole Compound

As said, the at least one tetrazole compound is selected from the group consisting of those of formulae T-1, T-2, T-3 and T-4, as represented above.

It is further understood that in the formulae T-1 and T-3, each $R_2$ and in the formulae T-2, each $M^{+n}$ metal cation, respectively may at each occurrence independently be bonded to the tetrazole ring at the 1- or 2-position.

In the formulae T-1 and T-3, as shown above, of the composition (C) of the present invention, $R_2$ is preferably selected from a group consisting of hydrogen, $C_1$-$C_{10}$-alkyl, $C_3$-$C_6$-cycloalkyl, phenyl, naphthyl and substituted phenyl groups of formula, as shown below:

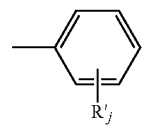

wherein:
each of R', equal to or different from each other, is selected from the group consisting of halogen, alkyl, haloalkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, nitro and nitroso, 5-tetrazolyl;
j is zero or is an integer from 0 to 4.
Most preferably, $R_2$ is a hydrogen.

In the formulae T-1, T-2 and T-4, as shown above, of the composition (C) of the present invention, $R_1$ is preferably selected from a group consisting of phenyl, naphthyl and substituted phenyl groups of formula, as shown below:

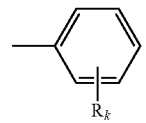

wherein:
each of R, equal to or different from each other, is selected from the group consisting of halogen, alkyl, haloalkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, nitro and nitroso, 5-tetrazolyl;
k is zero or is an integer from 0 to 4.
Most preferably, $R_1$ is a phenyl.

In the formula T-2, as shown above, of the composition (C) of the present invention, $R_1$ can also be a 5-tetrazoyl radical to form a bis-tetrazole.

In the formulae T-3 and T-4, respectively, as shown above, of the composition (C) of the present invention, $R_{1'}$ and $R_{2'}$, equal to or different from each other and at each occurrence, are independently selected from a group consisting of a bond; a straight-chain or branched-chain alkylene group having 1 to 10 carbon atoms, optionally substituted by phenyl, benzyl, halogen, nitro, hydroxy, $C_1$-$C_4$-alkoxy, formyl, $C_2$-$C_5$-alkanoyl, benzoyl or cyclohexylcarbonyl; an alkylene group having from 2 to 8 carbon atoms, being optionally interrupted by —O—, —S—, —SO$_2$— or —NY—, wherein Y may be hydrogen, $C_1$-$C_4$-alkyl, phenyl, naphthyl, cyclohexyl, benzyl, a group of the formula $R_3CO$—, $R_3SO_2$—, whereby $R_3$ may be choose from $C_1$-$C_4$-alkyl, phenyl, or phenyl substituted by $C_1$-$C_4$-alkyl, halogen or $C_1$-$C_4$-alkoxy; an alkenylene or alkynylene group, each independently from each other, having 2 to 8 carbon atoms, or a radical of the formula —Ar—(CH$_2$)$_m$—, —(CH$_2$)$_m$—Ar—(CH$_2$)$_m$—, —(CH$_2$)$_m$—O—Ar—O—(CH$_2$)$_m$—, —(CH$_2$)$_m$—NH—Ar—NH—(CH$_2$)$_m$—, —(CH$_2$)$_m$—Ar—

X—Ar—(CH$_2$)$_m$—, —(CH$_2$)$_m$—O—Ar—X—Ar—O—(CH$_2$)$_m$— or —(CH$_2$)$_m$—NH—Ar—X—Ar—NH—(CH$_2$)$_m$—, wherein m represents 1 or 2, and Ar represents a phenylene or naphthylene group, which can be substituted by halogen, NO$_2$, alkyl or alkoxy each having from 1 to 4 carbon atoms, and X is selected from a group consisting of a bond, —O—, —S—, —SO$_2$—, —CH$_2$—, —C(CH$_3$)$_2$ or —CO—; a radical of the formula —Ar—, —CH$_2$—Ar—CH$_2$—, —CH$_2$—Ar—X or —Ar—CH$_2$— wherein Ar represents a phenylene or naphthylene group, optionally substituted by halogen, NO$_2$, alkyl or alkoxy each having from 1 to 4 carbon atoms, and X is selected from a group consisting of a bond, —O—, —S—, —SO$_2$—, —CH$_2$—, —C(CH$_3$)$_2$ or —CO—; a bivalent heterocyclic radical of the general formula of —(CH$_2$)$_n$-Het-(CH$_2$)$_n$—, wherein n represents 0, 1 or 2, and Het represents a 5- or 6-membered, non-condensed or condensed hetero ring having 1 to 3 N, O or S atoms, or a radical of the formula, as shown below:

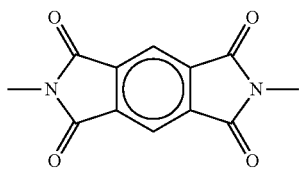

According to a preferred embodiment of the invention, the tetrazole compound is of formula T-1, as detailed above, wherein R$_1$ and R$_2$ are as defined above.

Non limitative examples of tetrazole compounds of formula T-1 suitable for the invention include notably 5-phenyltetrazole, 5-butyltetrazole, 5-isobutyltetrazole, 5-tert-butyltetrazole, N-hydroxymethyl tetrazole, N-hydroxymethyl 5-phenyltetrazole, N-hydroxyethyl tetrazole, N-hydroxyethyl 5-phenyltetrazole, N-benzyl tetrazole, N-benzyl 5-phenyltetrazole, 5-benzyltetrazole, N-Tolyl 5-phenyltetrazole, N-methylnaphthyl 5-phenyltetrazole, N-xylyl 5-phenyltetrazole, N-ethylphenyl 5-phenyltetrazole, N-ethylnaphthyl 5-phenyltetrazole, N-propylphenyl 5-phenyltetrazole Excellent results were obtained when the tetrazole compound is 5-phenyltetrazole.

The tetrazole compound of the present invention, as detailed above, can be prepared by any method known in the art for the manufacture of tetrazoles, such as notably disclosed in U.S. Pat. Nos. 3,442,829; 3,873,477; 4,142,029 and 4,774,266, which are all incorporated herein by reference in their entirety.

The Applicant has surprisingly found that the tetrazole compound of the present invention, as detailed above, in particular 5-phenyltetrazole, can suitably be used as a chemical foaming agent in the composition (C) of the present invention.

Chemical foaming agents generally refer to those compositions which decompose or react under the influence of heat in foaming conditions, to generate a foaming gas.

The tetrazole compounds of the present invention surprisingly allows the composition (C) to foam at particularly high foaming temperatures (i.e. generally above 250° C. to above 315° C.) with uniform evolution of nitrogen gas and formation of a foam material having unexpectedly a well defined and homogeneous cell structure as evidenced by smaller foam cells, higher foam void contents, and/or greater uniformity of cell size.

Without being bound by this theory, the Applicant thinks that the tetrazole compounds can suitably distribute uniformly the olefinic polymer throughout the foam material.

Additive

As said, the at least one additive is selected from the group of titanium dioxide (TiO$_2$), clays, talc, silicates, silica, aluminates, barites, titanates, borates, nitrides, carbon-based materials or combinations thereof.

Non limiting examples of carbon-based materials notably include diamonds, carbon black, nanotubes and graphenes and the like.

Preferably, the at least one additive is selected from the group of TiO$_2$, silicates and talc.

Talc is most preferred additive.

The Composition (C)

The weight of the (PAES) polymer, based on the total weight of the composition (C), is advantageously equal to or below 99.8%, preferably equal to or below 99.0%, more preferably equal to or below 98.5%, even more preferably equal to or below 98.0% and most preferably below 97.0%. On the other hand, the weight of the (PAES) polymer, based on the total weight of the composition (C), is advantageously equal to or above 70%, preferably equal to or above 80%, more preferably equal to or above 85%.

Good results were obtained when the (PAES) polymer was present in an amount ranging from 80 to 99 wt. %, based on the total weight of the composition (C).

Excellent results were obtained when the (PAES) polymer was present in an amount ranging from 85 to 98.5 wt. %, based on the total weight of the composition (C).

The weight of the olefinic polymer, based on the total weight of the composition (C), is advantageously equal to or below 9%, preferably equal to or below 7%, more preferably equal to or below 5%. On the other hand, the weight of the olefinic polymer, based on the total weight of the composition (C), is advantageously equal to or above 0.5%, preferably equal to or above 1.0%, more preferably equal to or above 1.4%.

The weight of the tetrazole compound, based on the total weight of the composition (C), is advantageously equal to or below 4.5%, preferably equal to or below 3.0%, more preferably equal to or below 2.5%, even more preferably equal to or below 2.0%. On the other hand, the weight of the tetrazole compound, based on the total weight of the composition (C), is advantageously equal to or above 0.05%, preferably equal to or above 0.1%, more preferably equal to or above 0.6%.

The weight of the additive, based on the total weight of the composition (C), is advantageously equal to or below 2.00%, preferably equal to or below 1.50%, more preferably equal to or below 1.25%, even more preferably equal to or below 1.00%. On the other hand, the weight of the additive, based on the total weight of the composition (C), is advantageously equal to or above 0.05%, preferably equal to or above 0.10%, more preferably equal to or above 0.20%, even more preferably equal to or above 0.25%.

In the composition (C) of the present invention, the (PAES) polymer, as detailed above and the olefinic polymer, as detailed above, are present as separate chemical entities that can be distinguished, using standard analytical techniques, for example such as microscopy, or dynamic mechanical analysis, thereby providing a least two distinct polymeric phases in the composition (C) one of which mainly comprises the (PAES) polymer, as detailed above and one of which mainly comprises the olefinic polymer, as detailed above.

In one preferred embodiment of the present invention, the at least two distinct polymeric phases in the composition (C), as described above, are present in an amount of at least 70 wt. %, preferably of at least 80 wt. % and more preferably of at least 90 wt. %, based on the total weight of the (PAES) polymer and the olefinic polymer.

In general, the at least two distinct polymeric phases can be present in any specific morphology known in the art, such as notably spherical, perforated layers, cylindrical, lamellar, gyroid, interpenetrated network, and the like.

Thus, in other words, the (PAES) polymer and the olefinic polymer in the composition (C) of the present invention may be completely immiscible or may show partial miscibility.

It is generally known that compositions including phase separated polymers, as detailed above, have also at least two different density values.

The density values of the composition (C) can be measured ASTM D792.

In one embodiment of the present invention, the composition (C) has two density values wherein the difference in absolute value δ between density value 1 (D1) and density value 2 (D2) is at least 0.1 g/cm$^3$, preferably at least 0.2 g/cm$^3$, more preferably at least 0.5 g/cm$^3$.

The Applicant has surprisingly found that despite the presence of a least two distinct polymeric phases in the foamable composition (C), as explained above, one of which mainly comprises the (PAES) polymer, as detailed above and one of which comprises the olefinic polymer, as detailed above, the composition (C) is effective in providing microcellular foam materials having high void content, cell sizes having very fine (i.e. about ~5 μm) unfoamed domains which are distributed substantially uniformly throughout the foam and are found embedded in the cells, as will be discussed in detail below.

The Applicant has surprisingly found that the presence of small amounts of the additive, as detailed above, in the foamable composition (C), when the same is submitted to foaming, advantageously provides for a change, being an increase or a decrease, in the overall density of foam material relative to the overall density of foam materials which do not include said additive.

The composition (C) can further comprise one or more additional ingredient (I) other than the (PAES) polymer, as described above, the olefinic polymer, as described above, the tetrazole compound, as described above, and the additive, as described above, generally selected from the group consisting of (i) colorants such as notably a dye (ii) pigments such as notably titanium dioxide, zinc sulfide and zinc oxide (iii) light stabilizers, e.g. UV stabilizers (iv) heat stabilizers (v) antioxidants such as notably organic phosphites and phosphonites, (vi) acid scavengers (vii) processing aids (viii) internal lubricants and/or external lubricants (ix) flame retardants (x) smoke-suppressing agents (xi) anti-static agents (xii) anti-blocking agents (xiii) conductivity additives such as notably carbon black and carbon nanofibrils (xiv) surfactants (xv) reinforcing fillers additives (xvi) impact modifiers and (xvii) release agents.

Surfactants typically can help nucleating bubbles and stabilize them during the bubble growth phase of the foaming process.

When one or more than one additional ingredient (I) are present, their total weight, based on the total weight of composition (C), is usually below 20%, preferably below 10%, more preferably below 5% and even more preferably below 2%.

Thus, the weight of said ingredient (I), based on the total weight of polymer composition (C), ranges advantageously from 0 to 20%, preferably from 0 to 10% and more preferably from 0 to 5%.

The composition (C) of the invention is preferably consisting essentially of the (PAES) polymer, as described above, the olefinic polymer, as described above, the tetrazole compound, as described above, and the additive, as described above, and optionally, one or more than one additional ingredient (I), as described above.

For the purpose of the present invention, the expression "consisting essentially of" is to be understood to mean that any additional component different from the (PAES) polymer, as described above, the olefinic polymer, as described above, the tetrazole compound, as described above, and the additive, as described above, and optionally, one or more than one additional ingredient (I), as described above, is present in an amount of at most 1% by weight, based on the total weight of the composition (C), so as not to substantially alter advantageous properties of the composition.

The composition (C) of the present invention can be prepared by a variety of methods involving intimate admixing of the (PAES) polymer, as described above, the olefinic polymer, as described above, the tetrazole compound, as described above, and the additive, as described above, with any optional ingredient (I), as detailed above.

Said intimate admixing typically includes dry blending, melt mixing or a combination of dry blending and melt mixing.

Dry blending is typically carried out by using high intensity mixers, such as notably Henschel-type mixers and ribbon mixers.

The composition (C) can be isolated and stored as foamable compounds, before undergoing any significant foaming, or can be obtained in situ during the process leading to substantial foaming.

With regards to technique leading to the manufacture of composition (C) wherein no significant foaming has occurred, several embodiments can be described.

According to certain embodiments, the (PAES) polymer, as described above, the olefinic polymer, as described above, the tetrazole compound, as described above, and the additive, as described above, with any optional ingredient (I), as detailed above, are subjected to a dry blending thereby forming a powder mixture containing the (PAES) polymer, as described above, the olefinic polymer, as described above, the tetrazole compound, as described above, and the additive, as described above, with any optional ingredient (I), as detailed above.

Said obtained powder mixture can then be further used for the manufacture of the foam material, as this will be detailed below, or can be used as masterbatch and diluted in further amounts of the (PAES) polymer, the olefinic polymer, the tetrazole compound, and the additive, and any optional ingredient (I) in subsequent processing steps.

It is also possible to manufacture the composition (C) of the invention by further melt compounding said powder mixture as above described. As said, melt compounding can be effected on the powder mixture as detailed above, or preferably directly on the (PAES) polymer, as described above, the olefinic polymer, as described above, the tetrazole compound, as described above, and the additive, as described above, and any optional ingredient (I), as detailed above.

Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

Specially designed extruders, i.e. extruders specifically designed to effectively control temperature such that further processes such as foaming is not prematurely initiated and such that the composition may be melted, blended, extruded and pelletized without premature foaming of the composition, are particularly preferred. The design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients, but still mild enough to advantageously keep the processing temperature of the composition below that in which foaming may be prematurely initiated so as to obtain strand extrudates of the composition (C) of the invention which have not undergone significant foaming.

Such strand extrudates can be chopped by means e.g. of a rotating cutting knife aligned downwards the die plate, generally with an underwater device, which assures perfect cutting knife to die plate alignment, and collected under the form of pellets or beads. Thus, for example composition (C) which may be present in the form of pellets or beads can then be further used for the manufacture of the foam material.

According to certain embodiments, it can be possible to combine separately the (PAES) polymer, as described above, with at least one of the other ingredients of the composition (C), that is to say the olefinic polymer, as described above, the tetrazole compound, as described above, and the additive, as described above, and optionally any optional ingredient (I), as detailed above, so as to obtain a pre-mix comprising said (PAES) polymer and at least one of said additional ingredients, and then combining said pre-mix with the remainder ingredients of the composition (C).

Such pre-mix can be obtained according to any of the techniques already described above, and in particular using compounding devices as above detailed and manufacturing said pre-mix under the form of pellets or beads.

Similarly, according to certain embodiments, it can be possible to combine separately the olefinic polymer, as described above, with at least one of the other ingredients of the composition (C), that is to say the (PAES) polymer, as described above, the tetrazole compound, as described above, and the additive, as described above, and optionally any optional ingredient (I), as detailed above, so as to obtain a pre-mix comprising said olefinic polymer and at least one of said additional ingredients, and then combining said pre-mix with the remainder ingredients of the composition (C).

Specifically, according to certain preferred embodiments, the (PAES) polymer is combined with the additive, as above detailed, so as to provide a first pre-mix under the form of pellets including said (PAES) polymer and said additive, while the olefinic polymer is combined with said tetrazole compound, so as to provide a second pre-mix under the form of pellets including said olefinic polymer and said tetrazole compound, and then further mixing said first pre-mix and said second pre-mix, possibly in combination with additional amounts of (PAES) polymer and/or olefinic polymer.

The Applicant has surprisingly found that the formation of said second pre-mix under the form of pellets, as detailed above, greatly enhances the uniformly mixing of the tetrazole compound with the high processing temperature (PAES) polymer, and said additive, thereby allowing the tetrazole to act as a very efficient foaming agent in the formation of the foam material and that at high foaming temperatures. In general, the foaming agent needs to be sufficiently soluble to grow the voids into the bubbles that form a foam material having the selected density. The walls of the bubbles need to be sufficiently stable such that they do not rupture or coalesce so as to form a stable foam as it cools, the result is a good, uniform, small celled foam having a selected density. Specifically, the use of said second pre-mix prevents premature decomposition of the foaming agent, and improves the foaming efficiency leading to narrow cell size distribution.

The Foam Material

As said, the Applicant has surprisingly found that the composition (C), as mentioned above, is effective in providing foam materials having unfoamed domains which are distributed substantially uniform throughout the foam and are found embedded in the cells. It is understood that the unfoamed domains mainly comprises the olefinic polymer, as detailed above, as it is known that the olefinic polymer has poor melt strength at high foaming temperatures of above 250° C.

These unfoamed domains are advantageously very fine having a size equal to or lower than 20 µm, preferably equal to or lower than 10 µm, more preferably equal to or lower than ~5 µm.

The Applicant has been found that the foam materials of the present invention, thus having these unfoamed domains are endowed by having superior mechanical properties such as high stiffness and strength properties, improved thermal performance capabilities, in particular more robust resistance to very high temperatures used in the manufacturing of structural foamed articles and having improved chemical resistance, improved structural integrity, high void content and closed cell structures.

The invention further pertains to a process for making a foam material by foaming the composition (C), as detailed above.

The foam material of the present invention may be formed using any foaming processes, which is capable of forming the foam material. Suitable foaming processes that may be used in the present invention include, but are not limited to, pressure cell processes, autoclave processes, extrusion processes, direct injection processes and bead foaming.

The extrusion process is most preferred.

A pressure cell process, for example, is carried out batchwise and in which the composition (C) is initially formed and is then charged with a gas under a pressure that is higher than atmospheric pressure and at a temperature that is below the glass transition temperature of the polymer/gas mixture. The temperature is then raised to a temperature that is above the glass transition temperature but below the critical temperature of the polymer/gas mixture, by immersing in a heating bath, and then the gas is driven out of the formed body to produce the desired foam structure. Transfer from the pressure cell to the heating bath must be carried out as fast as possible, considering that the dissolved gas can quickly diffuse out of the polymer at ambient pressure. After foaming, the polymeric formed body must be quenched in an ethanol/water mixture at about 20° C.

In an autoclave process, for example, the composition (C) is charged with a gas at a temperature that is above the glass transition temperature of the polymer/gas mixture and foaming is induced by spontaneous release of the pressure. In contrast to the pressure cell process, in which the gas-charged polymer is normally transferred to a heating bath to raise the temperature to above the glass transition temperature but below the critical temperature of the polymer/gas mixture, the autoclave process does not need a heating stage as the polymer is already at the required temperature that is above the glass transition temperature on charging with the gas.

An extrusion process, in contrast to the two processes described above, is a continuous process.

According to a preferred embodiment, the forming of the foam material include the melting of the first pre-mix under the form of pellets including said (PAES) polymer and said additive, as detailed above, giving a melt. Said melt is further mixed with the second pre-mix under the form of pellets including said olefinic polymer and said tetrazole compound, as detailed above.

Any suitable extrusion equipment capable of processing the composition (C) can be used for the extrusion. For example, single or multiple-screw extruders can be used, with a single extruder being preferred. While the melt is transported to a die, said melt is being cooled down to advantageously a temperature of at least 180° C., preferably of at least 250° C., more preferably of at least 300° C., even more preferably of at least 310° C. and most preferably of at least 315° C. to be able to be foamed by passing through the die, optionally transported from the die to calibrator, thereby forming the foam material.

If present, the calibrator may help to control the cooling rate of the foaming mixture. Therefore, it is beneficial in helping to control the thickness, width and density of the foam material.

According to ordinary practice in the art, the temperature profile of the extrusion equipment is advantageously set up so that the entry zones are cooler than the successive zones, in order to prevent premature decomposition of the tetrazole compound, as detailed above.

As said, the die is thus operating at a specific temperature, namely at a temperature of at least 180° C., preferably of at least 250° C., more preferably of at least 300° C., even more preferably of at least 310° C. and most preferably of at least 315° C.

The Applicant has surprisingly found that these high foaming temperatures allows for fine control of the cell size.

The foam materials, as formed may be in a variety of shapes, such as foam boards, foam sheets, foam film, foam tubes or any shape possible as determined by the skilled in the art using standard techniques and routine work, temperature, power and residence time of the composition in the extruder so as to obtain final desired shaped foamed parts having the desired void fraction or foaming level.

An aspect of the present invention also provides an article comprising at least one component comprising the foam material, detailed as above, which provides various advantages over prior art parts and articles, in particular higher stiffness and improved strength properties at a given foam density and higher impact resistance.

Preferably, the article or part of the article consists of the foam material as above detailed.

Non limitative examples of the article or part of the article, as described above, include an aircraft structural component, an automotive structural component, an oil and gas structural component, a medical structural component, a wire and cable component.

In one particular embodiment, the article is an aircraft structural component.

In another particular embodiment, the article is an automotive structural component.

In yet another particular embodiment, the article is an oil and gas structural component.

In yet another particular embodiment, the article is medical structural component.

In yet another particular embodiment, the article is a wire and cable component.

Non limitative examples of wire and cable components include films, tapes, cross webs and the like which can for example be wrapped around single or bundled groups of wires wherein said wires can be used as jacketing or within cables, specifically as primary insulation in cables.

The Applicant has surprisingly found that the composition (C) of the present invention, meets the new halogen free low smoke requirement of IEC 62812-1 and UL 2885.

The Applicant has also surprisingly found that the foam material, as mentioned above, made from said composition (C) can provide articles, in particular wire and cable components which pass the stringent NFPA 262 smoke and flame test for Plenum (CMP) applications.

For example, tapes and cross webs, as mentioned above, can notably used in CMP Cat. 6 telecommunication cables.

The wire and cable component, as mentioned above, can suitably be used in other plenum applications, including, but not limiting to, plenum fiber optic (OFNP) applications, in particular plenum fiber optic jackets, loose tubes, buffers, and fillers; plenum raceways; fire alarm cables; and the like.

The wire and cable component, as mentioned above, can also suitably be used in telecommunication applications, in particular in telecommunication riser applications. Thus, the wire and cable component may be a telecommunication riser cable.

The wire and cable component, as mentioned above, can also suitably be used in transportation applications (e.g. railway and shipboard), aerospace applications, military applications (e.g. MIL SPEC), industrial applications, consumer electronic applications, and other applications.

EXAMPLES

The invention will now be described in more details with reference to the following examples, whose purpose is merely illustrative and not intended to limit the scope of the invention.

Raw Materials

Talc: IMI Fabi HTP-4 talc, available from IMO Fabi LLC
Udel® P-1700NT sulfone polymer commercially available from Solvay Specialty Polymers USA, LLC, having a melt flow rate according to ASTM D1238 of 7.0 g/10 min as measured at 343° C. and 2.16 kg weight.
5-phenyltetrazole chemical foaming agent
Polypropylene Polymer
General Procedure for the Preparation of the Foam Material (P)

The (PAES) polymer was compounded with talc in an appropriate amount as shown in Table 1 below (i.e. 0.25% wt., 0.50% wt., 0.75% wt. and 1% wt. relative to total weight of the foamable composition). Compounding into pellets was performed on a Berstorff 25 mm twin screw extruder having an L/D ratio of 40:1 and eight barrel sections, of which sections 2-8 are equipped with heating and cooling. In each case, the base polymer pellets and the talc were first tumble-blended for twenty minutes and then the mix was fed to the throat of the extruder. The extruder was set at a barrel temperature of 330° C. for barrel sections 2-8. The die temperature was set at 340° C. and a screw speed of 200 rpm was used along with a throughput rate of 25 lb/hr. Vacuum venting of the melt was performed at barrel section 7. The extrudate from the extruder in each case was cooled in a water trough and then pelletized. The pellets produced from the formulation were dried at temperatures between 110 and 150° C. for 8 hours. The compounded pellets were then fed to a foaming set up, along with pellets containing the polypropylene polymer and the 5-phenyl tetrazol wherein the feed ratios were adjusted to achieve the polymer, the talc, the polypropylene polymer and 5-phenyl tetrazole concentrations shown in Table 1 below. The foaming setup consisted of a ¾ inch diameter Brabender single screw extruder with 4 heating/cooling zones and with an L/D ratio of 30:1, fitted with a 4 inch film die. The temperature profile of the extruder was set up so that the entry zones are cooler than the successive zones, in order to prevent premature decomposition of the foaming agent. The mixture was cooled down to temperatures between 180 and 330° C. at the die, and then extruded through the film die which is at the appropriate foaming temperature, see below, to form a foamed film. No attempt was made to freeze the foam surface or to increase the thickness of the foamed film in order to reduce the rate of loss of foaming agent.

Should the disclosure of any patents, patent applications, and publications which are incorporated herein by reference conflict with the description of the present application to the extent that it may render a term unclear, the present description shall take precedence.

The Following Characterizations Carried Out on the Materials of the Examples are Indicated Hereinafter:

Density Measurements

The mean density was measured following the procedure of the D1622 ASTM method.

Cell Size Measurements

Mean cell size and cell size distribution in the foams obtained were characterized by scanning electron microscopy (SEM). Image analysis of the SEM images of foam cross sections was performed using the "ImageJ" image analysis software Version 1.44 which is publically available on the Internet.

Examples 1-3, 5-7 and 9-10

Foamed films were produced according to the general procedure, described above at a foaming temperature of 321° C. The results are summarized in Table 1. The SEM images of the foamed films obtained are having very fine (i.e. about ~5 μm) unfoamed domains which are distributed substantially uniform throughout the foam and are found embedded in the cells.

Comparative Examples 4, 8 and 11

Foamed films were produced according to the general procedure, described above, except that no talc was added to the foamable composition. The results are summarized in Table 1.

Examples 12-14

Foamed films were produced according to the general procedure, described above at a foaming temperature of 319° C. The results are summarized in Table 1.

TABLE 1

| | (PAES) polymer: Udel® P-1700NT sulfone polymer (% wt.) | Talc (% wt.) | Mean density (kg/m$^3$) | Mean cell size (μm) |
|---|---|---|---|---|
| Foaming conditions: 321° C. 1.4% wt. polypropylene- 0.6% wt. of 5-phenyl tetrazole | | | | |
| Example 1 | 97.75 | 0.25 | 878.38 | 83.93 |
| Example 2 | 97.50 | 0.50 | 803.83 | 163.77 |
| Example 3 | 97.00 | 1.00 | 827.85 | 126.11 |
| Comparative Example 4 | 98.00 | — | 664.93 | 135.51 |
| Foaming conditions: 321° C. 2.1% wt. polypropylene- 0.9% wt. of 5-phenyl tetrazole | | | | |
| Example 5 | 97.75 | 0.25 | 939.25 | 80.02 |
| Example 6 | 97.50 | 0.50 | 928.89 | 73.78 |
| Example 7 | 97.00 | 1.00 | 924.41 | 90.36 |
| Comparative Example 8 | 98.00 | — | 700.64 | 112.64 |
| Foaming conditions: 321° C. 2.8% wt. polypropylene- 1.2% wt. of 5-phenyl tetrazole | | | | |
| Example 9 | 97.75 | 0.25 | 935.19 | 75.45 |
| Example 10 | 97.00 | 1.00 | 857.16 | 61.29 |
| Comparative Example 11 | 98.00 | — | 697.42 | 64.10 |
| Foaming conditions: 319° C. 2.8% wt. polypropylene- 1.2% wt. of 5-phenyl tetrazole | | | | |
| Example 12 | 97.75 | 0.25 | 941.47 | 75.99 |
| Example 13 | 97.50 | 0.50 | 917.73 | 73.63 |
| Example 14 | 97.25 | 0.75 | 923.96 | 53.16 |

The invention claimed is:

1. A foamable composition (C) comprising:
(i) from 60 to 99.88 wt. % of at least one poly(aryl ether sulfone) (PAES) polymer, wherein more than 50% by moles of the recurring units of the poly(aryl ether sulfone) (PAES) polymer are recurring units ($R_{PAES}$) selected from the group consisting of those of formulae (S-A) to (S-C):

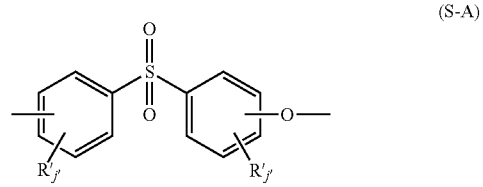

(S-A)

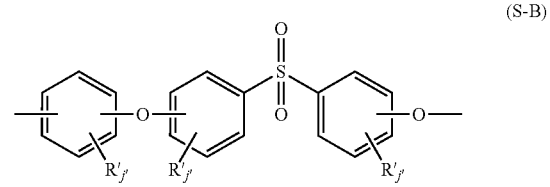

(S-B)

-continued

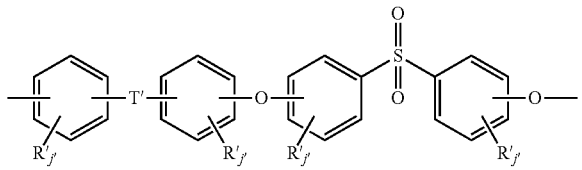
(S-C)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;
j' is zero or is an integer from 0 to 4;
T is a bond or a divalent group optionally comprising one or more than one heteroatom;
(ii) from 0.10 to 10.00 wt. % of at least one olefinic polymer selected from the group consisting of a very low density polyethylene, a linear low density polyethylene, a low density polyethylene, a high density polyethylene, a propylene homopolymer, a propylene copolymer, a linear homogeneous ethylene/alpha-olefin copolymer, a homogeneous ethylene/alpha-olefin copolymer having long chain branching,
(iii) from 0.01 to 5.00 wt. % of at least one tetrazole compound selected from the group consisting of those of formulae T-1, T-2, T-3 and T-4:

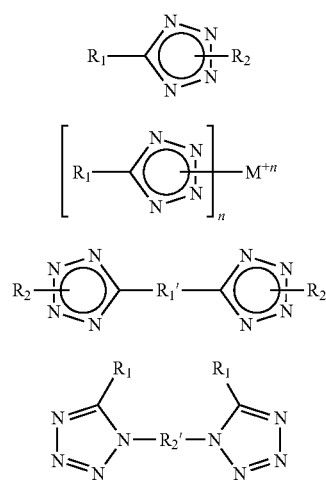

wherein:
$R_1$ is selected from a group consisting of alkyl, cycloalkyl, arylalkyl, and aryl group,
$R_2$ is selected from a group consisting of hydrogen, alkyl, cycloalkyl, hydroxyalkyl, polyhydroxyalkyl, aryl, alkylaryl, aralkylene, alkenyl, alkenylaryl, and alkenylaralkylene group,
$R_{1'}$ and $R_{2'}$, equal to or different from each other and at each occurrence, is independently selected from a group consisting of a bond or a divalent group optionally comprising one or more than one heteroatom, n is a number 2 or 3, M is a metal cation selected from the group consisting of barium, calcium, zinc lead, or aluminium, and
(iv) from 0.01 to 2.50 wt. % of at least one additive selected from the group of titanium dioxide ($TiO_2$), clays, talc, silicates, silica, aluminates, barites, titanates, borates, nitrides, carbon-based materials or combinations thereof,
all wt. % are relative to the total weight of the composition (C).

2. The foamable composition (C) according to claim 1, wherein the poly(aryl ether sulfone) (PAES) polymer is a bisphenol A polysulfone wherein more than 50% by moles of the recurring units of said bisphenol A polysulfone are recurring units ($R_a$) of formula (A):

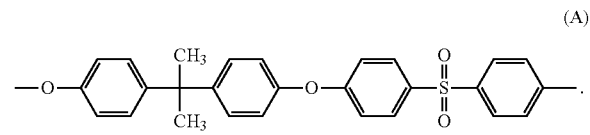
(A)

3. The foamable composition (C) according to claim 1, wherein the olefinic polymer is selected from the group consisting of a very low density polyethylene, a linear low density polyethylene, a low density polyethylene, a propylene homopolymer, or a propylene copolymer.

4. The composition (C) according to claim 1, wherein the tetrazole compound is of formula T-1:

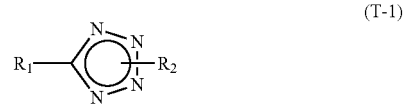
(T-1)

wherein:
$R_1$ is selected from a group consisting of phenyl, naphthyl and substituted phenyl groups of formula:

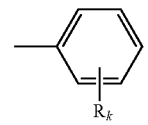

wherein:
each of R, equal to or different from each other, is selected from the group consisting of halogen, alkyl, haloalkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium, nitro and nitroso, 5-tetrazolyl;
k is zero or is an integer from 0 to 4; and $R_2$ is selected from a group consisting of hydrogen, $C_1$-$C_{10}$-alkyl, $C_3$-$C_6$-cycloalkyl, phenyl, naphthyl and substituted phenyl groups of formula:

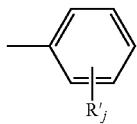

wherein:
each of R', equal to or different from each other, is selected from the group consisting of halogen, alkyl, haloalkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium, nitro and nitroso, 5-tetrazolyl; and
j is zero or is an integer from 0 to 4.

5. The foamable composition (C) according to claim 1, wherein the additive is selected from the group of $TiO_2$, silicates, and talc.

6. The composition (C) according to claim 1 comprising from 0.01 to 1.00 wt. % of the additive.

7. The composition (C) according to claim 1 further comprising one or more additional ingredient (I) other than the poly(aryl ether sulfone) PAES polymer, the olefinic polymer, the tetrazole compound, and the additive, selected from the group consisting of (i) colorants, (ii) pigments, (iii) light stabilizers, (iv) heat stabilizers, (v) antioxidants, (vi) acid scavengers, (vii) processing aids, (viii) internal lubricants and/or external lubricants, (ix) flame retardants, (x) smoke-suppressing agents, (xi) anti-static agents, (xii) anti-blocking agents, (xiii) conductivity additives, (xiv) surfactants, (xv) reinforcing fillers additives, (xvi) impact modifiers, and (xvii) release agents.

8. A process for manufacturing the foamable composition (C) according to claim 1, which comprises mixing:
the at least one poly(aryl ether sulfone) (PAES) polymer,
the at least one olefinic polymer,
the at least one tetrazole compound, and
the at least one additive, and
optionally, one or more than one additional ingredient (I).

9. The process according to claim 8, wherein the mixing is carried out by dry blending, melt mixing, or a combination of dry blending and melt mixing.

10. A foam material made from the foamable composition (C) according to claim 1.

11. A process for making the foam material of claim 10 by foaming the foamable composition (C), wherein the foaming process is selected from a group consisting of pressure cell processes, autoclave processes, extrusion processes, direct injection processes, and bead foaming.

12. An article comprising at least one component comprising the foam material according to claim 10.

13. The article of according to claim 12, wherein said article is an aircraft structural component, an automotive structural component, an oil and gas structural component, a medical structural component, or a wire and cable component.

14. The article of according to claim 13, wherein the article is a wire and cable component.

15. The foamable composition according to claim 1, wherein T is selected from the group consisting of a bond, —$CH_2$—, —C(O)—, —$C(CH_3)_2$—, —$C(CF_3)_2$—, —$C(=CCl_2)$—, —$C(CH_3)(CH_2CH_2COOH)$—, —$SO_2$—, and a group of formula:

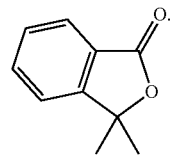

* * * * *